United States Patent
Challe et al.

[15] 3,684,347
[45] Aug. 15, 1972

[54] WHEEL SPOKE MOUNTED REFLECTOR

[72] Inventors: Henry W. Challe; Kathleen M. Challe, both of 1764 Chestnut, Redding, Calif. 96001

[22] Filed: Jan. 29, 1971

[21] Appl. No.: 111,028

[52] U.S. Cl.................................350/97, 280/289
[51] Int. Cl....................................G02b 5/12
[58] Field of Search....350/97, 99; 280/289, 200, 259–261

[56] References Cited

UNITED STATES PATENTS 3,547,516   12/1970   Shanok et al.................350/97

FOREIGN PATENTS OR APPLICATIONS 766,704   1/1957   Great Britain................350/99
527,981   12/1953   Italy............................350/99

*Primary Examiner*—David Schonberg
*Assistant Examiner*—Michael J. Tokar
*Attorney*—Clarence A. O'Brien and Harvey B. Jacobson

[57] ABSTRACT

A safety promotion attachment designed and adapted to be mounted and fastened on a selected spoke of a vehicle wheel and comprising a one piece plate or blade having suitable reflecting surfaces capable of warning and signalling nearby pedestrians and drivers of vehicles. One or more reflector attachments can be mounted on circumferentially spaces spokes of one or both wheels and are such in construction and adaptability that they well and effectively serve the special safeguarding purposes for which they are intended.

6 Claims, 6 Drawing Figures

PATENTED AUG 15 1972
3,684,347
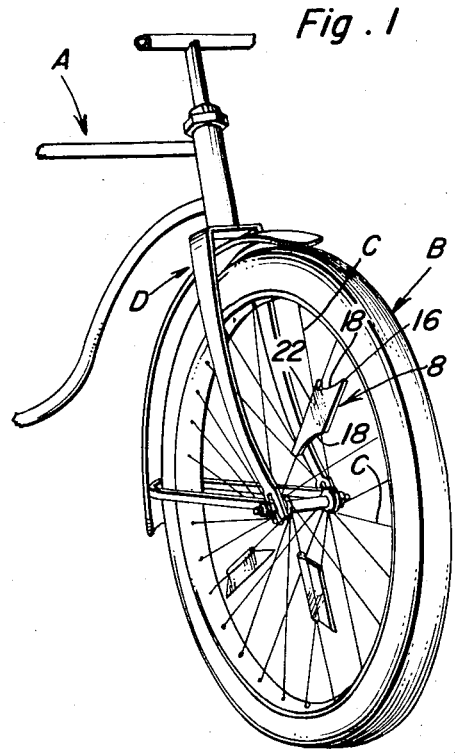
Fig. 1
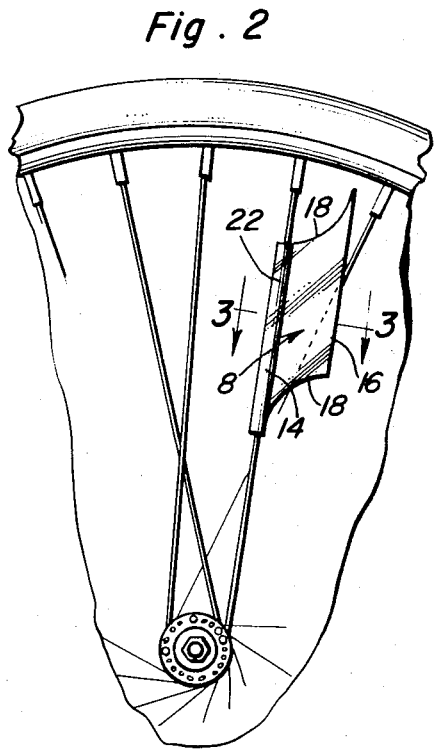
Fig. 2
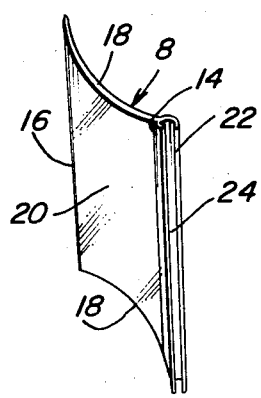
Fig. 4
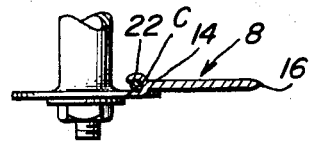
Fig. 3
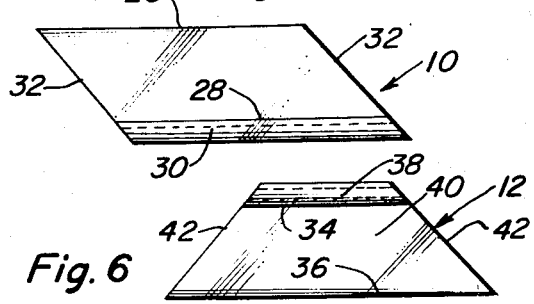
Fig. 5
Fig. 6
Henry W. Challe
Kathleen M. Challe
INVENTORS
BY Clarence A. O'Brien
and Harvey B. Jacobson
Attorneys

WHEEL SPOKE MOUNTED REFLECTOR

This invention relates to safeguarding reflector type devices and attachments which lend themselves to feasible and acceptable use on vehicles and has to do, more particularly, with a simple, practical readily applicable and removable light reflecting plate or blade which is expressly adapted for use on and in conjunction with a selected spoke of vehicle wheels, such as for example, bicycles, motor bikes, motorcycles and the like.

The promotion of safety for pedestrians, riders of bicycles and motorcycles and drivers of automobiles and motor vehicles has always posed a problem for all concerned. Inventors, particularly those concerned with riders of bicycles have offered and devised many and varied styles and forms of safety reflective devices. For background purposes one prior art adaptation which can be properly mentioned and considered is the bicycle reflecting element disclosed in U.S. Pat. No. 2,334,542 issued to Harry S. Fike. Another and broadly similar spoke supported reflector is covered in U.S. Pat. No. 3,310,357 issued to Paul J. Hogan. These two prior reference patents are touched upon here because of the fact that they show reflectors for natural and artificial light which are so constructed and arranged on the spokes of the wheel that they clear the front wheel fork arms and function to alert pedestrians, other riders of nearby bicycles and drivers of automobiles in a now generally well known manner.

An object of the present invention, generally stated, is to improve upon the aforementioned prior patents and other known similar signalling and warning devices and, in so doing, to advance this field of endeavor and to promote safe driving and to minimize accidents.

Briefly the safety reflective attachment hereinunder advisement lends itself to use on a spoke of a bicycle wheel. It comprises a plate or a blade of appropriate material, size and shape which preferably has forward and rearward reflecting surfaces and is characterized by inward and outward marginal edges joined by transverse edges, and adapter means which is carried by the inner marginal edge. The adapter means is adapted to be detachably and adjustably mounted on a selected spoke in a manner that it projects laterally outward beyond the locale of the selected spoke. Accordingly, when the wheel turns the reflector (or reflectors) sweeps through an orbital light reflecting path corresponding to the rotation of the wheel on which it is fastened.

More specifically novelty is predicated on a blade which is elongated and wherein the inward and outward longitudinal edges are straight from end to end and parallel with each other in one form or adaptation with the transverse edges disposed at right angles to the inward and outward longitudinal edges. Other embodiments or forms include the basic principles just stated but are angled or curved so that the overall contour of the blade is both attractive and feasibly usable.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a view in perspective showing a bicycle, that is, the front or forward wheel thereof and showing several of the reflectors attached at circumferentially spaced points to selected spokes and thus readied for use.

FIG. 2 is an enlarged fragmentary detailed view showing but a single reflector and how it is constructed and mounted for use.

FIG. 3 is an enlarged detailed sectional and elevational view taken approximately on the plane of the section line 3—3 of FIG. 2 looking in the direction of the indicating arrows.

FIG. 4 is a view in perspective of the spoke mounted reflector by itself.

FIG. 5 is a top plan view of a reflector embodying a slight modification in shape.

And FIG. 6 is a top plan view of a further modification having oblique angle transverse ends.

With reference first to FIG. 1 the bicycle frame is denoted at A, the wheel at B, the spokes at C and the usual wheel supporting and journaling fork at D.

Three forms of the reflector are shown and one form is denoted by the numeral 8 in FIG. 4. A second form is shown at 10 in FIG. 5 and the third from at 12 in FIG. 6. Basically all of these reflectors are much the same. The reflectors may be made of either lightweight metal or moldable plastic material and each reflector may vary in length, shape and size. The preferred construction is that illustrated wherein means is provided so that the adapter means can be simply snapped on a selected spoke and will retain the reflector in readiness for practical safe driving use. In connection with the several reflectors shown it can be pointed out at the outset that one or more reflectors can be mounted on the spokes C. For example several such reflectors 8 are shown in FIG. 1. It should be noted too that it is within the purview of the invention to make the reflectors from moldable plastic materials and to resort to the use of varying and different colors using several types of reflective colors to provide variety in appearance and appropriateness in safety promotion use. The reflectors may vary in length from 1 to 5 inches. The buyer is then able to resort to choice depending upon his requirements and the sizes of the bicycle wheel at hand. While the material presently and commonly used is plastic it is within the purview of the invention, as suggested, to resort to the use of metal with proper reflective properties.

The reflector 8 shown in FIGS. 1 to 4 inclusive comprises a substantially rectangular or elongated blade having inward lengthwise attaching edge 14, and outward marginal edge 16 and transverse edges 18 which connect the longitudinal edges and which can be arcuately curved as shown. The reflecting surfaces are smooth and generally planar for best results as is denoted at 20. The adapter means along the edge 14 comprises a head which is of a length commensurate with the length of the edge 14, this bead being denoted at 22 and having a channel or slot 24 which opens through the opposite ends of the bead. The thus constructed bead can be readily snapped in place or removed and it will stay put in the position given. On the other hand it can be adjusted toward or from the hub or rim as desired. In FIG. 5 the modification has an inward longitudinal edge 26 and outward edge 28 with a grooved or channeled bead 30 corresponding to the bead 22. Here the transverse edges are angled as at 32.

In the modification shown in FIG. 6 the blade has inward and outward longitudinal edges 34 and 36, the edge 34 being provided with a channeled bead 38, the blade portion 40 having oblique angled transverse edges 42.

Experience has shown that mounting even a single light reflecting attachment or blade on a single spoke of a bicycle wheel may well serve the safety promotion results desired. On the other hand it is within the discretion of users to employ several reflectors and to mount the same on the spokes at circumferentially spaced points as illustrated in FIG. 1. It is reiterated that the grooved or channeled adapter bead 24 is resilient and is so proportioned and made that it can be snapped on the spoke and thereafter freed if and when desired. The reflector is proportional with the length of the spoke and can be shifted inwardly toward the hub or outwardly toward the rim of the wheel as is self-evident.

It is submitted that reflector attachments used in the manner shown and described will safeguard the lives of bicycle riders (often youngsters) and will reduce accidents to an acceptable minimum.

The foregoing is considered as illustrative only of the principles of the invention. Further, since numerous modification and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A safety reflective attachment for a spoke on a vehicle wheel comprising: a blade having light reflecting surfaces and inward and outward marginal edges, and adapter means carried by the inner marginal edge, said adapter means being adapted to detachably and adjustably mount said blade on a selected spoke in a manner that it projects outwardly beyond the locale of the selected spoke and sweeps through an orbital light reflecting path corresponding to the rotation of the wheel on which it is mounted and fastened, said blade being elongated and including inward and outward longitudinal edges joined at their ends by transverse edges, said adapter means comprising a longitudinal bead integral with and extending along said inward edge, said bead having a longitudinal keying groove formed therein open at its respective ends and opening through an exposed longitudinal surface of said bead for snap-on attachment of the bead to a selected wheel spoke with the spoke extending lengthwise through the groove.

2. The spoke attachment defined in and according to claim 1 wherein said inward and outward longitudinal edges are straight from end to end and parallel with each other, said transverse edges being disposed at right angles to said inward and outward longitudinal edges.

3. The spoke attachment defined in and according to claim 1, wherein said inward and outward longitudinal edges are straight from end to end and being parallel to each other, said transverse edges being disposed at an oblique angle relative to said inward and outward longitudinal edges and converging in a direction toward the inward longitudinal edge.

4. The spoke attachment defined in and according to claim 1, wherein said inward and outward longitudinal edges are straight from end to end and being parallel to each other, said transverse edges being arcuately curved.

5. The spoke attachment defined in and according to claim 1 and wherein said attachment is of one piece construction and is made of colorful moldable plastic material.

6. The spoke attachment defined in and according to claim 1 and wherein said attachment is of one piece construction, said light reflecting surfaces being smooth and flat and such that they reflect both natural and artificial light.

* * * * *